(12) United States Patent
Kang et al.

(10) Patent No.: US 12,227,228 B2
(45) Date of Patent: Feb. 18, 2025

(54) FRONT VEHICLE BODY STRUCTURE

(71) Applicants: Hyundai Motor Company, Seoul (KR); Kia Corporation, Seoul (KR)

(72) Inventors: Chang Hak Kang, Hwaseong-si (KR); Chan Woong Jeon, Yeonsu-gu (KR); Chulhee Heo, Hwaseong-si (KR); Haehoon Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 434 days.

(21) Appl. No.: 17/859,586

(22) Filed: Jul. 7, 2022

(65) Prior Publication Data

US 2023/0202577 A1  Jun. 29, 2023

(30) Foreign Application Priority Data

Dec. 27, 2021  (KR) ................. 10-2021-0188456

(51) Int. Cl.
*B62D 25/08* (2006.01)
*B60K 11/04* (2006.01)
*B62D 25/02* (2006.01)
*B62D 25/18* (2006.01)
*B62D 27/06* (2006.01)

(52) U.S. Cl.
CPC ............ *B62D 25/082* (2013.01); *B60K 11/04* (2013.01); *B62D 25/025* (2013.01); *B62D 25/084* (2013.01); *B62D 25/081* (2013.01); *B62D 25/18* (2013.01); *B62D 27/065* (2013.01)

(58) Field of Classification Search
CPC .. B62D 25/084; B62D 25/081; B62D 25/082; B62D 25/025; B60K 11/04

USPC ........................................................ 296/198
See application file for complete search history.

(56) References Cited

U.S. PATENT DOCUMENTS

| | | | | |
|---|---|---|---|---|
| 8,038,205 B2 * | 10/2011 | Hedderly | ............... | B62D 65/04 |
| | | | | 296/203.03 |
| 9,227,665 B2 * | 1/2016 | Mildner | ............... | B62D 25/082 |
| 11,472,492 B2 * | 10/2022 | Song | .................... | B62D 27/023 |
| 11,591,026 B2 * | 2/2023 | Song | .................... | B62D 27/023 |
| 11,772,708 B2 * | 10/2023 | Song | .................... | B62D 21/152 |
| | | | | 296/187.09 |
| 11,873,028 B2 * | 1/2024 | An | ........................ | B62D 25/08 |
| 11,939,003 B2 * | 3/2024 | Kang | .................. | B62D 25/2027 |
| 12,043,103 B2 * | 7/2024 | Danneberg | ............... | B60K 1/04 |
| 12,103,595 B2 * | 10/2024 | Jeon | .................... | B62D 25/081 |
| 2023/0052420 A1 * | 2/2023 | Dias | ........................ | B62D 27/02 |
| 2023/0202576 A1 * | 6/2023 | Kang | ................. | B62D 25/2018 |
| | | | | 296/193.02 |
| 2023/0211831 A1 * | 7/2023 | Jeon | .................... | B62D 25/145 |
| | | | | 296/70 |

(Continued)

FOREIGN PATENT DOCUMENTS

DE  202014009810 U1 *  9/2015  ............ B60R 19/26

*Primary Examiner* — Jason S Morrow
(74) *Attorney, Agent, or Firm* — Slater Matsil, LLP

(57) ABSTRACT

An embodiment front vehicle body structure of a vehicle body is provided. The vehicle body includes an under body and an upper body coupled to the under body, and the front vehicle body structure includes side sills respectively disposed at two opposite sides of the upper body based on a vehicle width direction and wheel arch members respectively connected directly to front ends of the side sills in a forward/rearward direction of the vehicle body and coupled to a front part of the under body.

20 Claims, 12 Drawing Sheets

(56) References Cited

U.S. PATENT DOCUMENTS

| | | | |
|---|---|---|---|
| 2023/0331310 A1* | 10/2023 | Lee | B62D 25/04 |
| 2023/0391404 A1* | 12/2023 | Shin | B62D 25/02 |
| 2023/0399060 A1* | 12/2023 | Shin | B62D 27/065 |
| 2024/0190509 A1* | 6/2024 | Lee | B62D 25/04 |
| 2024/0198916 A1* | 6/2024 | Kang | B60R 7/12 |
| 2024/0294060 A1* | 9/2024 | Harsch | B62D 21/03 |

* cited by examiner

FRONT VEHICLE BODY STRUCTURE

CROSS-REFERENCE TO RELATED APPLICATIONS

This application claims the benefit of Korean Patent Application No. 10-2021-0188456, filed on Dec. 27, 2021, which application is hereby incorporated herein by reference.

TECHNICAL FIELD

The present invention relates to a vehicle body of a vehicle.

BACKGROUND

Recently, new mobility visions with new concepts for implementing human-oriented dynamic future cities have been introduced to vehicle industries. One of the future mobility solutions is a purpose-built vehicle (PBV) as a purpose-based mobility vehicle.

For example, the PBV is an environmental-friendly movement solution for providing various types of customized services to an occupant while moving to the destination on the ground. The PBV may set an optimum route for each situation and perform platooning by using electric vehicle (EV)-based artificial intelligence.

Further, the PBV is manufactured in a box shape having a wide indoor space. In addition, to provide the wide indoor space in the PBV, a wind shield glass and a cowl are disposed at a foremost side of the vehicle body.

A vehicle body of the PBV includes an under body (also called a rolling chassis or a skateboard in the art), and an upper body assembled to the under body.

It is important to ensure connection durability of members constituting a front part of the upper body of the vehicle body of the PBV. In addition, the vehicle body of the PBV needs to have characteristics capable of effectively dispersing a load applied to a front side of the vehicle body while ensuring increases in durability and strength of a mounting part of the front part of the upper body and a mounting part of the front part of the under body.

The above information disclosed in this background section is only for enhancement of understanding of the background of the invention, and therefore it may contain information that does not form the prior art that is already known to a person of ordinary skill in the art.

SUMMARY

The present invention relates to a vehicle body of a vehicle. Particular embodiments relate to a front vehicle body structure of a purpose built vehicle (PBV).

Embodiments of the present invention can provide a front vehicle body structure capable of ensuring connection durability of members constituting a front part of an upper body and dispersing a load applied to the front part of the upper body in a forward/rearward direction of the vehicle body, a vehicle width direction, and an upward/downward direction.

Embodiments of the present invention also can provide a front vehicle body structure capable of improving durability and strength of a mounting part of a front part of an upper body and a mounting part of a front part of an under body.

An exemplary embodiment of the present invention provides a front vehicle body structure of a vehicle, which includes an under body and an upper body coupled to the under body, the front vehicle body structure including: i) side sills respectively disposed at two opposite sides of the upper body based on a vehicle width direction; and ii) wheel arch members respectively connected directly to front ends of the side sills in a forward/rearward direction of the vehicle body and coupled to a front part of the under body.

In addition, in the front vehicle body structure according to an exemplary embodiment of the present invention, the wheel arch members may be disposed above front tire wheels respectively coupled to two opposite sides of the front part of the under body based on the vehicle width direction.

In addition, in the front vehicle body structure according to an exemplary embodiment of the present invention, the wheel arch members may each have a closed cross-section formed by joining a wheel arch outer member and a wheel arch inner member.

In addition, in the front vehicle body structure according to an exemplary embodiment of the present invention, bulkheads may be respectively coupled to front ends of the wheel arch members.

In addition, the front vehicle body structure according to an exemplary embodiment of the present invention may further include radiator support side members respectively coupled to front ends of the wheel arch members and disposed in an upward/downward direction.

In addition, in the front vehicle body structure according to an exemplary embodiment of the present invention, the radiator support side members may be respectively coupled to the front ends of the wheel arch members through lower ends thereof and each have a shape curved in a streamlined shape in the upward/downward direction.

In addition, in the front vehicle body structure according to an exemplary embodiment of the present invention, the radiator support side members may each have a closed cross-section formed by joining a radiator support side outer member and a radiator support side inner member.

In addition, in the front vehicle body structure according to an exemplary embodiment of the present invention, the radiator support side members may be respectively coupled, through upper ends thereof, to front ends of front cowl support side members respectively disposed in the forward/rearward direction of the vehicle body at two opposite sides of a front part of the upper body based on the vehicle width direction.

In addition, in the front vehicle body structure according to an exemplary embodiment of the present invention, a front cowl may be coupled in the vehicle width direction to the front ends of the front cowl support side members.

In addition, the front vehicle body structure according to an exemplary embodiment of the present invention may further include a radiator support lower member coupled to the lower ends of the radiator support side members and disposed in the vehicle width direction.

In addition, in the front vehicle body structure according to an exemplary embodiment of the present invention, the radiator support lower member may have a closed cross-section formed by joining an upper support member and a lower support member.

In addition, the front vehicle body structure according to an exemplary embodiment of the present invention may further include body mounting brackets respectively coupled to the front ends of the wheel arch members, the lower ends of the radiator support side members, and two opposite ends of the radiator support lower member.

In addition, in the front vehicle body structure according to an exemplary embodiment of the present invention, the body mounting brackets may be respectively fastened, by mounting bolts, to body mounting parts respectively disposed at two opposite sides of the front part of the under body based on the vehicle width direction.

According to the embodiments of the present invention, it is possible to ensure connection durability of the members constituting the front part of the upper body in the forward/rearward direction of the vehicle body, the vehicle width direction, and the upward/downward direction.

In addition, according to the embodiments of the present invention, it is possible to improve durability and rigidity/strength of the mounting part of the front part of the upper body and the mounting part of the front part of the under body.

Other effects, which may be obtained or expected by the embodiments of the present invention, will be directly or implicitly disclosed in the detailed description of the embodiments of the present invention. That is, various effects expected according to the embodiments of the present invention will be disclosed in the detailed description to be described below.

BRIEF DESCRIPTION OF THE DRAWINGS

Because the drawings are provided for reference to describe embodiments of the present invention, the technical spirit of the present invention should not be construed as being limited to the accompanying drawings.

It should be understood that the accompanying drawings are not necessarily to scale, but provide a somewhat simplified representation of various preferred features that exemplify the basic principles of embodiments of the present invention. For example, specific design features of embodiments of the present invention, including particular dimensions, directions, positions, and shapes, will be partially determined by the particularly intended application and use environment.

DETAILED DESCRIPTION OF ILLUSTRATIVE EMBODIMENTS

Hereinafter, embodiments of the present invention will be described in detail with reference to the accompanying drawings so that those with ordinary skill in the art to which the present invention pertains may easily carry out the embodiments. However, the present invention may be implemented in various different ways and is not limited to the embodiments described herein.

The terms used herein are merely for the purpose of describing a specific embodiment, and not intended to limit the present disclosure. The singular expressions used herein are intended to include the plural expressions unless the context clearly dictates otherwise It is to be understood that the term "comprise (include)" and/or "comprising (including)" used in the present specification means that the features, the integers, the steps, the operations, the constituent elements, and/or component are present, but the presence or addition of one or more of other features, integers, steps, operations, constituent elements, components, and/or groups thereof is not excluded. The term "and/or" used herein includes any one or all the combinations of one or more listed related items. In the present specification, the term 'coupled' means a physical relationship between two components which are connected directly to each other or connected indirectly through one or more intermediate components by welding, a self-piercing rivet (SPR), a flow drill screw (FDS), a bonding agent for a structure, or the like.

The terms 'vehicle', 'for a vehicle', and 'automobile' or the similar terms used in the present specification generally include vehicles (passenger automobiles) including passenger vehicles, sport utility vehicles (SUVs), buses, trucks, and various commercially available vehicles and include hybrid vehicles, electric vehicles, hybrid electric vehicles, purpose built vehicles (PBVs) based on electric vehicles, hydrogen power vehicles, and other alternative fuel vehicles (e.g., fuel induced from other resources than petroleum).

Hereinafter, embodiments of the present invention will be described in detail with reference to the accompanying drawings.

Figure 1:
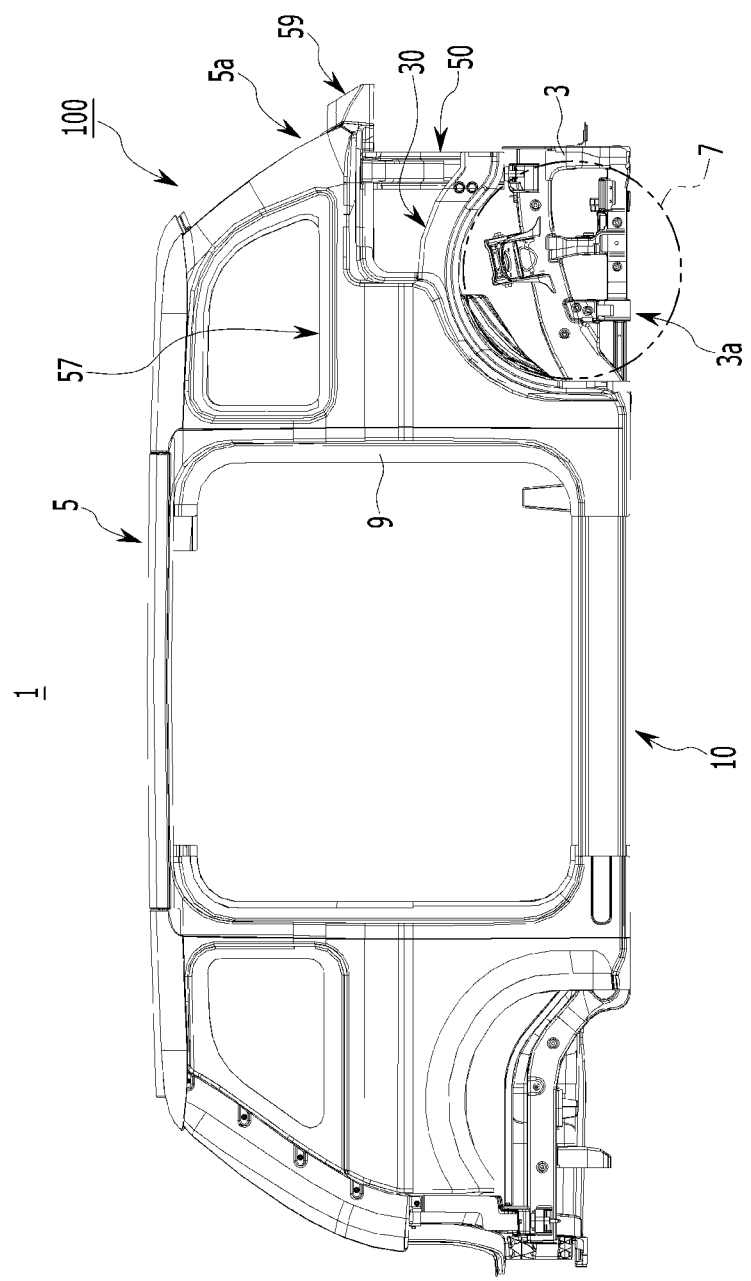
FIG. 1 is a view illustrating an example of a vehicle body of a PBV to which a front vehicle body structure according to embodiments of the present invention is applied.
Figure 2:
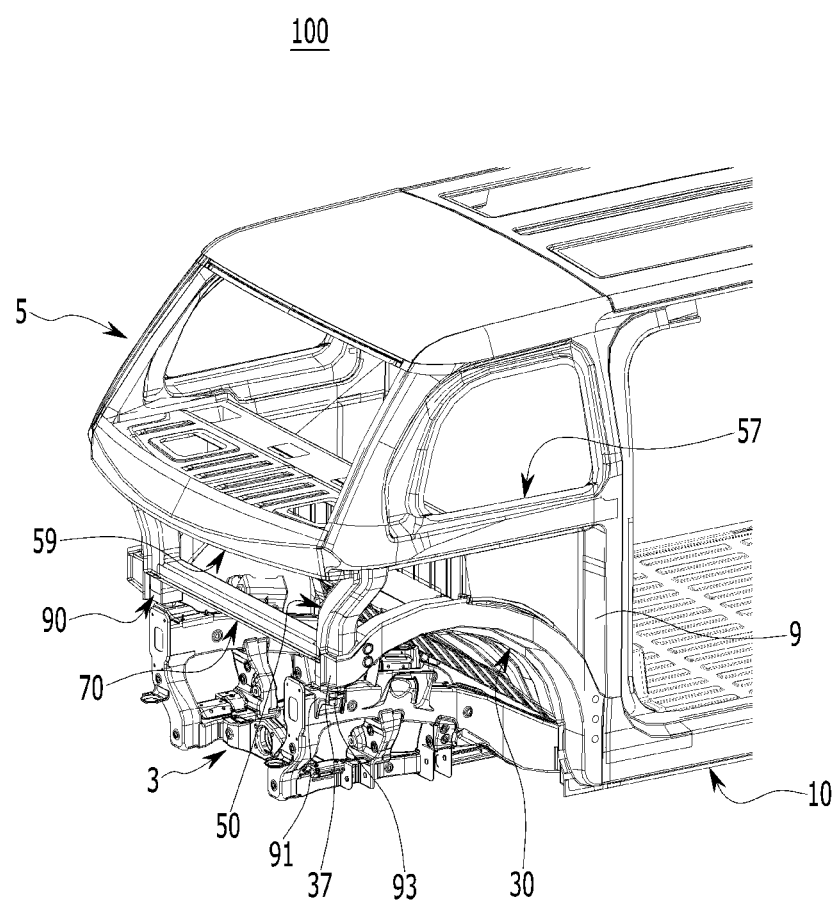
FIGS. 2 to 5 are perspective views illustrating the front vehicle body structure according to the embodiments of the present invention.
Figure 3:
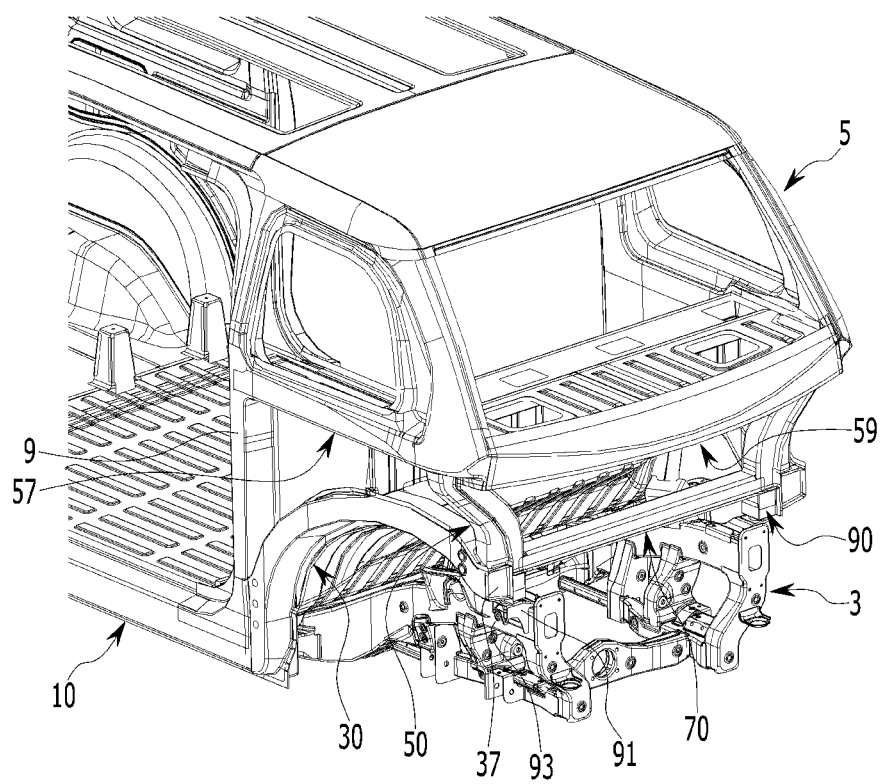
Figure 4:
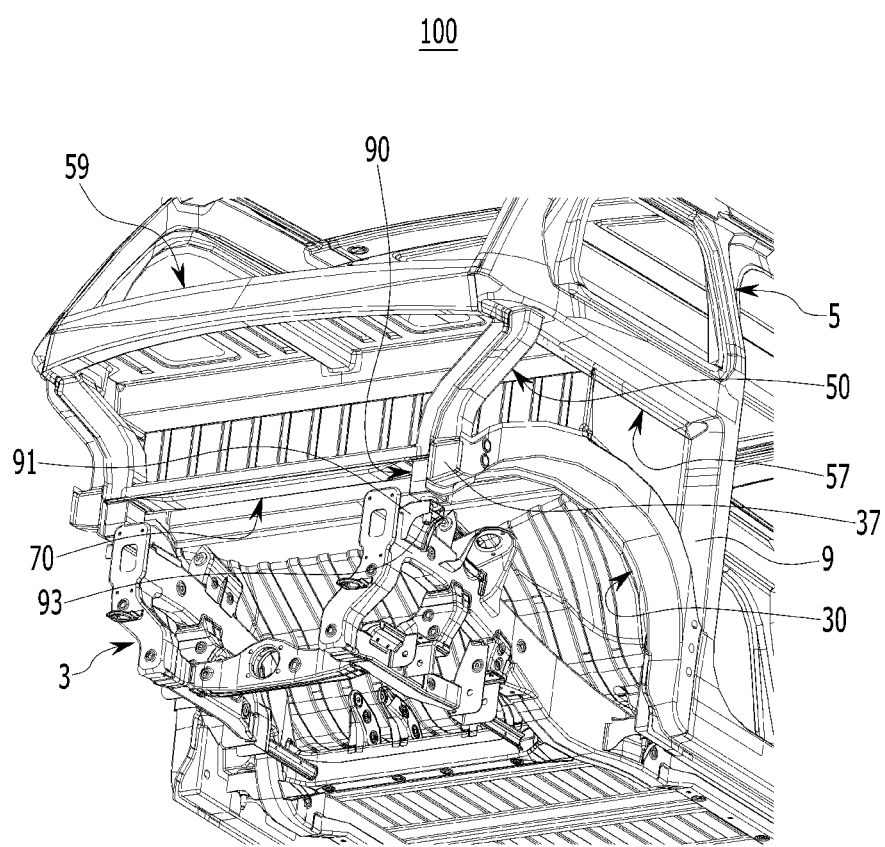
Figure 5:
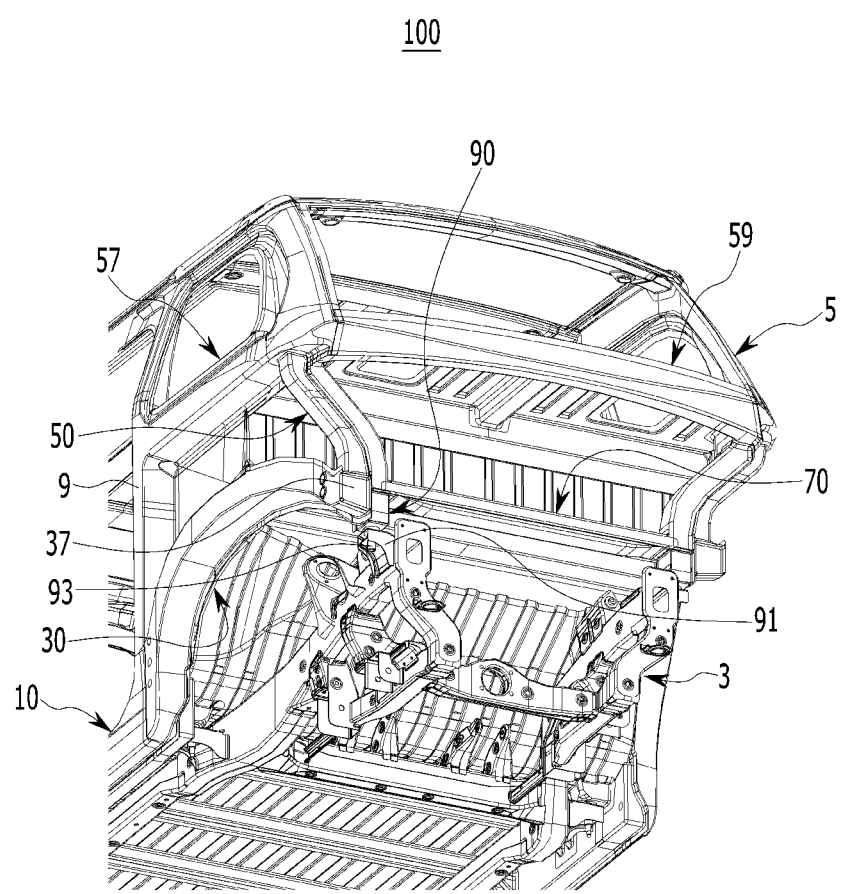

FIG. 1 is a view illustrating an example of a vehicle body of a PBV to which a front vehicle body structure according to an embodiment of the present invention is applied.

Referring to FIG. 1, as an example, a front vehicle body structure 100 according to an embodiment of the present invention may be applied to a vehicle body 1 of a purpose-built vehicle (hereinafter, referred to as a 'PBV') as a purpose-based mobility vehicle.

The PBV may be an environmental-friendly movable vehicle based on an electric vehicle for providing necessary customized services to an occupant while moving to a destination on the ground. As an example, the PBV may be a box-shaped design vehicle (e.g., a rototaxi vehicle or a hailing vehicle) having a wide indoor space so that the PBV may move to the occupant's destination in an unmanned autonomous driving manner.

The vehicle body 1 of the PBV includes an under body 3 (typically also called a 'rolling chassis' in the art) of a skateboard type, and an upper body 5 assembled to the under body 3.

The under body 3 may be configured as a chassis frame on which a battery assembly (not illustrated) may be mounted. Further, the upper body 5 is a body in white (BIW) body coupled to the under body 3 and may constitute a cabin.

As an example, in the present specification, reference directions for explaining the following components are set as a forward/rearward direction of the vehicle body (e.g., a longitudinal direction of the vehicle body), a vehicle width direction, and an upward/downward direction.

In addition, in the present specification, the terms 'upper end portion,' 'upper portion', 'upper end' or 'upper surface' of a component means an end portion, a portion, an end, or a surface of the component which is disposed at a relative upper side in the drawings, and the terms 'lower end portion,' 'lower portion', 'lower end', or 'lower surface' of a component means an end portion, a portion, an end, or a surface of the component which is disposed at a relatively lower side in the drawings.

In addition, in the present specification, an end (e.g., one end or the other end) of a component means an end of the component in any one direction, and an end portion (e.g., one end portion or the other end portion) of a component means a predetermined portion of the component that includes the end of the component.

The front vehicle body structure 100 according to the embodiments of the present invention has a structure capable of ensuring connection durability of members constituting a front part 5a of the upper body 5.

In addition, the embodiments of the present invention provide the front vehicle body structure 100 capable of improving durability and rigidity/strength of a mounting part of a front part 3a of an under body 3 and a mounting part of the front part 5a of the upper body 5.

Furthermore, the embodiments of the present invention provide the front vehicle body structure 100 capable of effectively dispersing a load applied to a front side of the vehicle body 1.

FIGS. 2 to 5 are perspective views illustrating the front vehicle body structure according to the embodiments of the present invention.

Referring to FIGS. 1 to 5, the front vehicle body structure 100 according to embodiments of the present invention basically includes side sills 10, wheel arch members 30, radiator support side members 50, a radiator support lower member 70, and body mounting brackets 90.

In embodiments of the present invention, the side sills 10 are respectively provided at two opposite sides of the upper body 5 based on the vehicle width direction. The side sills 10 are each disposed in the forward/rearward direction of the vehicle body.

Figure 6:
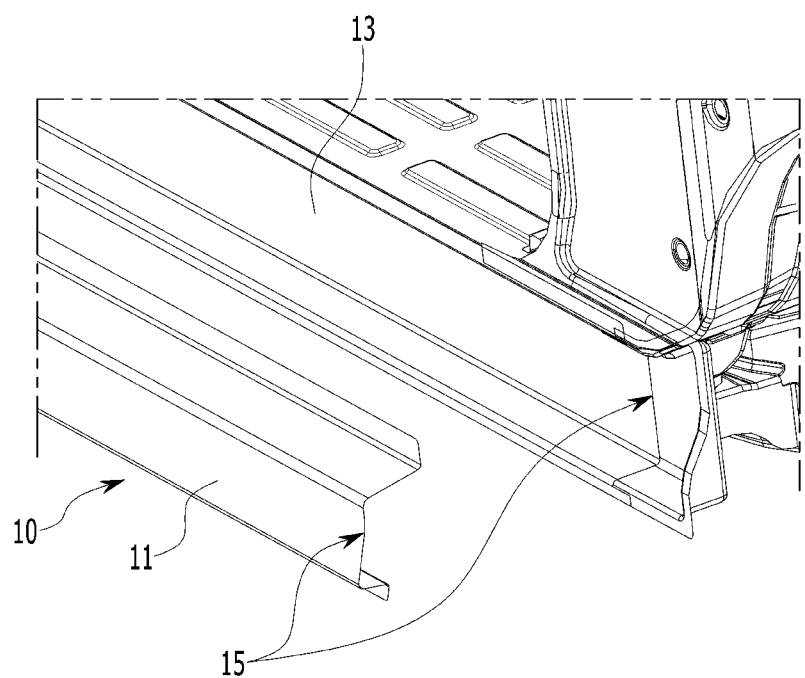
FIG. 6 is a view illustrating a side sill applied to the front vehicle body structure according to the embodiments of the present invention.

As an example, as illustrated in FIG. 6, the side sills 10 each have a closed cross-section 15 formed by joining a sill outer member 11 and a sill inner member 13.

In embodiments of the present invention, the wheel arch member 30 is configured to connect the front part 3a of the under body 3 and the front part 5a of the upper body 5 in the forward/rearward direction of the vehicle body.

In addition, the wheel arch member 30 ensures connection durability of the front part 5a of the upper body 5 in the forward/rearward direction of the vehicle body. Further, the wheel arch member 30 disperses a load applied to the front part 5a of the upper body 5 in the forward/rearward direction of the vehicle body.

In the front part 5a of the upper body 5, the wheel arch member 30 is connected directly to a front end of the side sill 10 in the forward/rearward direction of the vehicle body. The wheel arch members 30 may be substantially coupled to the front part 3a of the under body 3.

The wheel arch members 30 are each provided in the form of a member curved in a rounded (e.g., arcuate) shape in the forward/rearward direction of the vehicle body. In this case, the wheel arch members 30 are disposed above front tire wheels 7 respectively coupled to two opposite sides of the front part 3a of the under body 3 based on the vehicle width direction. The front wheel arch members 30 are provided to avoid rotation trajectories of the front tire wheels 7.

Figure 7:
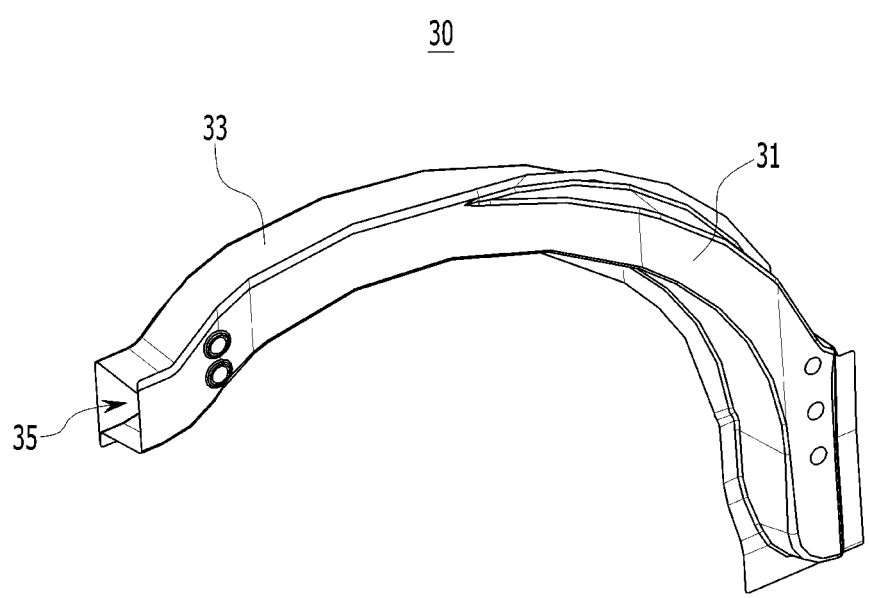
FIG. 7 is a view illustrating a wheel arch member applied to the front vehicle body structure according to the embodiments of the present invention.

As illustrated in FIG. 7, the wheel arch members 30 may each have a closed cross-section 35 formed by joining a wheel arch outer member 31 and a wheel arch inner member 33. The closed cross-sections 35 of the wheel arch members 30 may be respectively connected to the closed cross-sections 15 of the side sills 10.

Furthermore, bulkheads 37 may be respectively coupled to front ends of the wheel arch members 30. The bulkhead 37 serves to seal the front end of the wheel arch member 30 and reinforce torsional rigidity of the wheel arch member 30.

The bulkhead 37 may be disposed at the front end of the wheel arch member 30 and joined to an inner surface of the wheel arch outer member 31 and an inner surface of the wheel arch inner member 33.

In embodiments of the present invention, the radiator support side members 50 serve to support two opposite sides of a radiator (not illustrated) mounted on the front part 5a of the upper body 5.

In addition, the radiator support side members 50 connect the front part 3a of the under body 3 and the front part 5a of the upper body 5 in the upward/downward direction.

Further, the radiator support side members 50 ensure connection durability of the front part 5a of the upper body 5 in the upward/downward direction. Furthermore, the radiator support side members 50 disperse a load applied to the front part 5a of the upper body 5 in the upward/downward direction.

The radiator support side members 50 are respectively coupled to the front ends of the wheel arch members 30 and disposed in the upward/downward direction.

The radiator support side members 50 are respectively coupled to the front ends of the wheel arch members 30 through lower ends thereof. As an example, the radiator support side members 50 each have a shape curved in a streamlined shape in the upward/downward direction.

Figure 8:
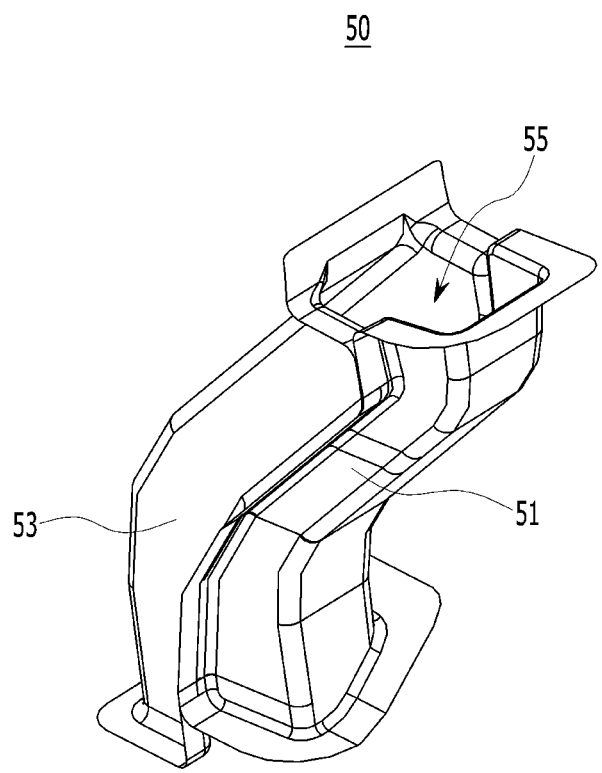
FIG. 8 is a view illustrating a radiator support side member applied to the front vehicle body structure according to the embodiments of the present invention.

As illustrated in FIG. 8, the radiator support side members 50 may each have a closed cross-section 55 formed by joining a radiator support side outer member 51 and a radiator support side inner member 53.

Further, the radiator support side members 50 may be respectively coupled to front cowl support side members 57 provided in the front part 5a of the upper body 5. The front cowl support side members 57 are provided at the two opposite sides of the front part 5a of the upper body 5 based on the vehicle width direction.

The front cowl support side members 57 are disposed in the forward/rearward direction of the vehicle body. Rear ends of the front cowl support side members 57 are respectively coupled to center pillars 9 provided in the upper body 5. Front ends of the front cowl support side members 57 are respectively coupled to the upper ends of the radiator support side members 50.

In this case, a front cowl 59 is coupled, in the vehicle width direction, to the front ends of the front cowl support side members 57. The front cowl 59 is disposed at the foremost side of the upper body 5 by the front cowl support side members 57.

In embodiments of the present invention, the radiator support lower member 70 serves to support a lower portion of the radiator (not illustrated) mounted on the front part 5a of the upper body 5.

In addition, the radiator support lower member 70 serves to connect the front part 3a of the under body 3 and the front part 5a of the upper body 5 in the vehicle width direction.

Further, the radiator support lower member 70 ensures connection durability of the front part 5a of the upper body 5 in the vehicle width direction. Furthermore, the radiator support lower member 70 disperses a load applied to the front part 5a of the upper body 5 in the vehicle width direction.

The radiator support lower member 70 is coupled to the lower ends of the radiator support side members 50 and disposed in the vehicle width direction.

Figure 9:
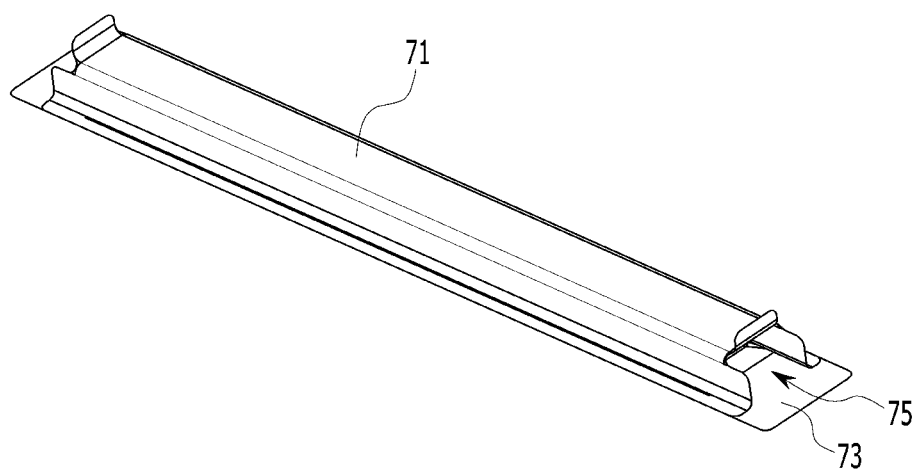
FIG. 9 is a view illustrating a radiator support lower member applied to the front vehicle body structure according to the embodiments of the present invention.

As illustrated in FIG. 9, the radiator support lower member 70 may have a closed cross-section 75 formed by joining an upper support member 71 and a lower support member 73.

In embodiments of the present invention, the body mounting brackets 90 serve to fasten the wheel arch members 30, the radiator support side members 50, and the radiator support lower member 70, which are coupled to one another, to the front part 3a of the under body 3.

The body mounting brackets 90 may be respectively coupled to the front ends of the wheel arch members 30, the lower ends of the radiator support side members 50, and the two opposite ends of the radiator support lower member 70.

The body mounting bracket 90 may be fastened, by mounting bolts 93, to body mounting parts 91 respectively disposed at the two opposite sides of the front part 3a of the under body 3 based on the vehicle width direction.

The body mounting brackets 90 may be respectively joined to the wheel arch inner members 33 at the front ends of the wheel arch members 30. Further, upper ends of the body mounting brackets 90 may be respectively joined to the lower ends of the radiator support side members 50.

In this case, the two opposite ends of the radiator support lower member 70 may be respectively joined to the radiator support side inner members 53 at the lower ends of the radiator support side members 50.

As an example, the body mounting bracket 90 may define a closed space having a quadrangular cross-sectional shape by being joined to the wheel arch inner member 33.

The body mounting brackets 90 may be fastened to the body mounting parts 91 by the mounting bolts 93 fixed by penetrating the lower ends of the body mounting brackets 90 in the upward/downward direction.

Hereinafter, an operation of the front vehicle body structure 100 according to the embodiments of the present invention configured as described above will be described in detail with reference to FIGS. 10 to 12.

Figure 10:
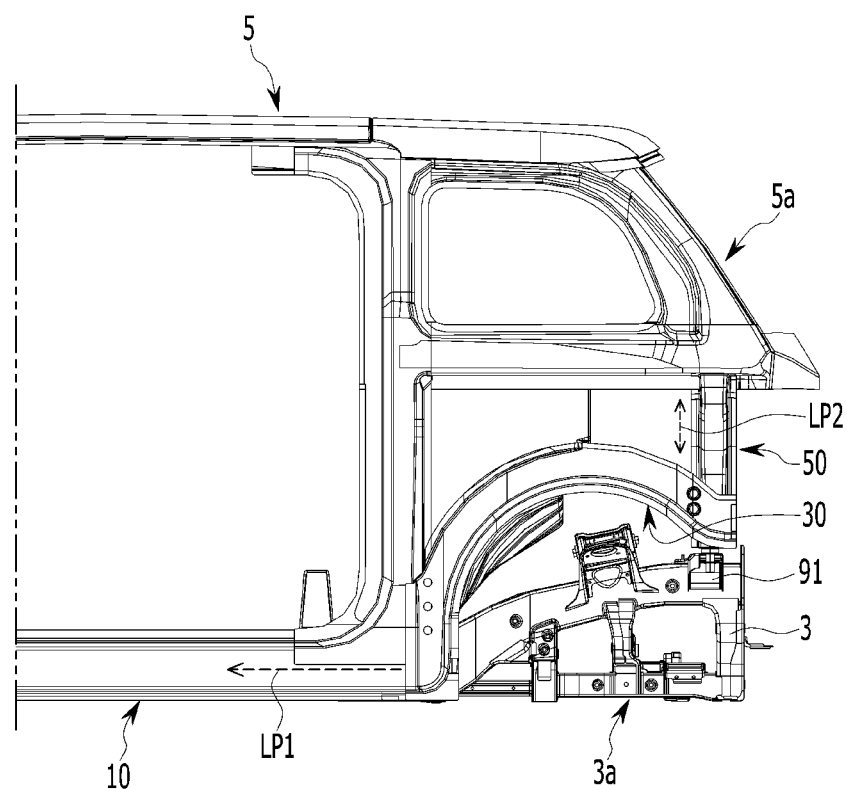
FIGS. 10 to 12 are views for explaining an operation of the front vehicle body structure according to the embodiments of the present invention.
Figure 11:
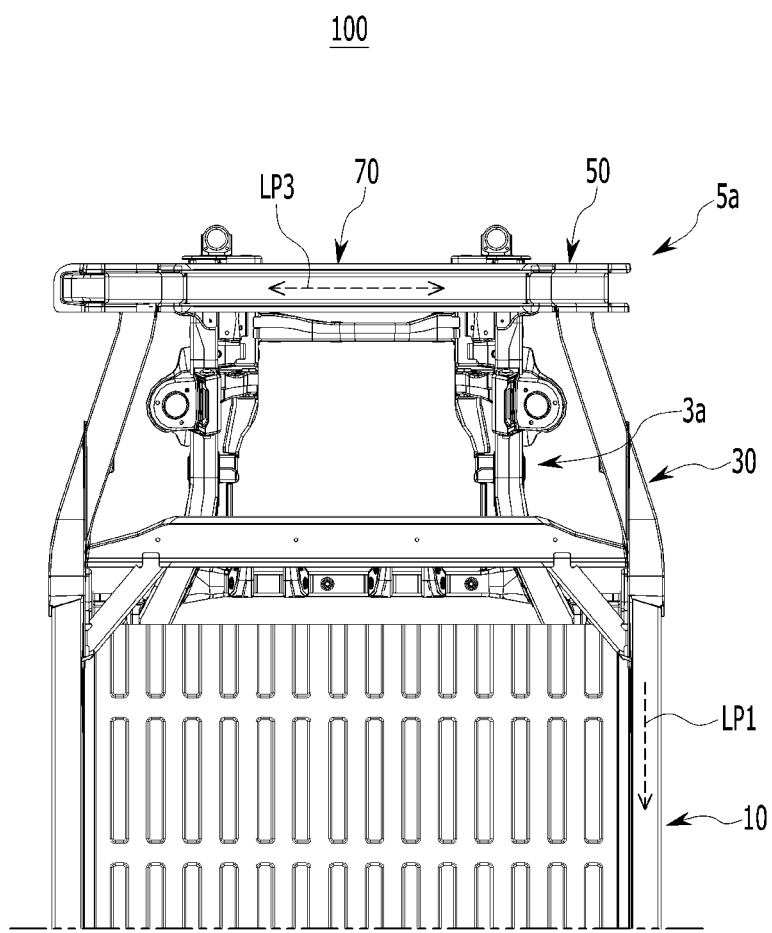
Figure 12:
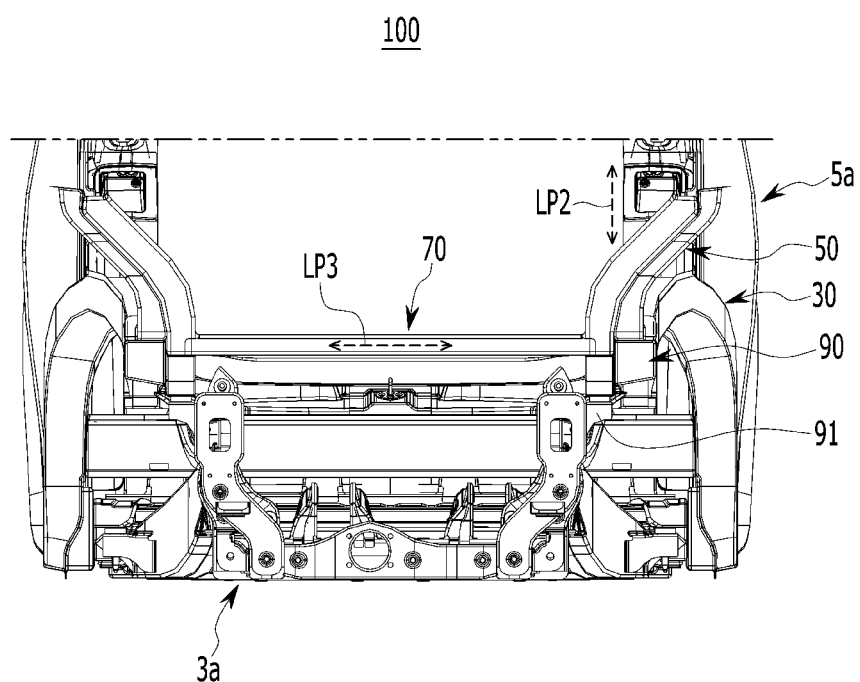

FIGS. 10 to 12 are views for explaining an operation of the front vehicle body structure according to embodiments of the present invention.

Referring to FIGS. 10 to 12, according to the front vehicle body structure 100 according to the embodiments of the present invention, the wheel arch members 30, the radiator support side members 50, and the radiator support lower member 70 may be directly connected by means of the body mounting brackets 90 in the front part 5a of the upper body 5.

In addition, in the front vehicle body structure 100 according to the embodiments of the present invention, the wheel arch members 30 may be connected directly to the side sills 10 in the forward/rearward direction of the vehicle body. Therefore, the front vehicle body structure 100 according to the embodiments of the present invention may ensure connection durability of the front part 5a of the upper body 5 in the forward/rearward direction of the vehicle body. Further, the front vehicle body structure 100 according to the embodiments of the present invention may define a first load path LP1 through which a load applied to the front part 5a of the upper body 5 is transmitted in the forward/rearward direction of the vehicle body through the wheel arch members 30. Therefore, the front vehicle body structure 100 according to the embodiments of the present invention may easily disperse a load applied to the front part 5a of the upper body 5 to the rear side in the forward/rearward direction of the vehicle body through the first load path LP1.

Further, the front vehicle body structure 100 according to the embodiments of the present invention may ensure connection durability of the front part 5a of the upper body 5 in the upward/downward direction by the radiator support side member 50. Further, the front vehicle body structure 100 according to the embodiments of the present invention may define a second load path LP2 through which a load applied to the front part 5a of the upper body 5 is transmitted in the upward/downward direction through the radiator support side member 50. Therefore, the front vehicle body structure 100 according to the embodiments of the present invention may easily disperse a load applied to the front part 5a of the upper body 5 in the upward/downward direction through the second load path LP2.

In addition, the front vehicle body structure 100 according to the embodiments of the present invention may ensure connection durability of the front part 5a of the upper body 5 in the vehicle width direction by the radiator support lower member 70. Further, the front vehicle body structure 100 according to the embodiments of the present invention may define a third load path LP3 through which a load applied to the front part 5a of the upper body 5 is transmitted in the vehicle width direction through the radiator support lower member 70. Therefore, the front vehicle body structure 100 according to the embodiments of the present invention may easily disperse a load applied to the front part 5a of the upper body 5 in the vehicle width direction through the third load path LP3.

Therefore, the front vehicle body structure 100 according to the embodiments of the present invention may improve frontal collision performance of the PBV by easily dispersing a load applied to the front part 5a of the upper body 5 in the forward/rearward direction of the vehicle body, the vehicle width direction, and the upward/downward direction.

Furthermore, according to the front vehicle body structure 100 according to the embodiments of the present invention, the body mounting brackets 90 to which the wheel arch members 30, the radiator support side members 50, and the radiator support lower member 70 are directly connected may be fastened to the body mounting parts 91 of the front part 3a of the under body 3. Therefore, the front vehicle body structure 100 according to the embodiments of the present invention may improve durability and rigidity/strength of the mounting part of the front part 3a of the under body 3 and the mounting part of the front part 5a of the upper body 5.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body structure of a vehicle body, the vehicle body comprising an under body and an upper body coupled to the under body, the front vehicle body structure comprising:

side sills respectively disposed at two opposite sides of the upper body based on a vehicle width direction; and wheel arch members respectively connected directly to front ends of the side sills in a forward/rearward direction of the vehicle body and coupled to a front part of the under body.

2. The front vehicle body structure of claim 1, wherein the wheel arch members are disposed above front tire wheels respectively coupled to two opposite sides of the front part of the under body based on the vehicle width direction.

3. The front vehicle body structure of claim 1, wherein the wheel arch members each have a closed cross-section defined by joining a wheel arch outer member and a wheel arch inner member.

4. The front vehicle body structure of claim 1, further comprising radiator support side members respectively coupled to front ends of the wheel arch members and disposed in an upward/downward direction.

5. The front vehicle body structure of claim 4, wherein the radiator support side members are respectively coupled to the front ends of the wheel arch members through lower ends thereof and each have a shape curved in a streamlined shape in the upward/downward direction.

6. The front vehicle body structure of claim 4, wherein the radiator support side members each have a closed cross-section defined by joining a radiator support side outer member and a radiator support side inner member.

7. The front vehicle body structure of claim 4, further comprising front cowl support side members respectively disposed in the forward/rearward direction of the vehicle body at two opposite sides of a front part of the upper body based on the vehicle width direction, wherein the radiator support side members are respectively coupled through upper ends thereof to front ends of the front cowl support side members.

8. The front vehicle body structure of claim 7, further comprising a front cowl coupled in the vehicle width direction to the front ends of the front cowl support side members.

9. The front vehicle body structure of claim 4, wherein the radiator support side members are respectively coupled to the front ends of the wheel arch members through lower ends of the radiator support side members, and wherein the front vehicle body structure further comprises a radiator support lower member coupled to the lower ends of the radiator support side members and disposed in the vehicle width direction.

10. The front vehicle body structure of claim 9, wherein the radiator support lower member has a closed cross-section defined by joining an upper support member and a lower support member.

11. The front vehicle body structure of claim 9, further comprising body mounting brackets respectively coupled to the front ends of the wheel arch members, the lower ends of the radiator support side members, and two opposite ends of the radiator support lower member.

12. The front vehicle body structure of claim 11, wherein the body mounting brackets are respectively fastened by mounting bolts to body mounting parts respectively disposed at two opposite sides of the front part of the under body based on the vehicle width direction.

13. The front vehicle body structure of claim 1, further comprising bulkheads respectively coupled to front ends of the wheel arch members.

14. A method of assembling a vehicle, the method comprising:
coupling an upper body of a vehicle body to an under body of the vehicle body;
disposing side sills respectively at two opposite sides of the upper body based on a vehicle width direction;
directly connecting wheel arch members respectively to front ends of the side sills in a forward/rearward direction of the vehicle body; and
coupling the wheel arch members to a front part of the under body.

15. The method of claim 14, wherein the wheel arch members are disposed above front tire wheels respectively coupled to two opposite sides of the front part of the under body based on the vehicle width direction.

16. The method of claim 14, wherein the wheel arch members each have a closed cross-section formed by joining a wheel arch outer member and a wheel arch inner member.

17. The method of claim 14, further comprising coupling radiator support side members respectively to front ends of the wheel arch members, wherein the radiator support side members are disposed in an upward/downward direction.

18. The method of claim 17, further comprising:
disposing front cowl support side members respectively in the forward/rearward direction of the vehicle body at two opposite sides of a front part of the upper body based on the vehicle width direction; and
coupling upper ends of the radiator support side members respectively to front ends of the front cowl support side members.

19. The method of claim 18, further comprising coupling a front cowl in the vehicle width direction to the front ends of the front cowl support side members.

20. The method of claim 14, further comprising:
coupling lower ends of radiator support side members respectively to front ends of the wheel arch members, wherein the radiator support side members are disposed in an upward/downward direction;
coupling a radiator support lower member to the lower ends of the radiator support side members, wherein the radiator support lower member is disposed in the vehicle width direction; and
coupling body mounting brackets respectively to the front ends of the wheel arch members, the lower ends of the radiator support side members, and two opposite ends of the radiator support lower member, wherein the body mounting brackets are respectively fastened by mounting bolts to body mounting parts respectively disposed at two opposite sides of the front part of the under body based on the vehicle width direction.

* * * * *